July 20, 1926.
F. R. BIGLER
PACKING
Filed Dec. 19, 1924
1,593,009
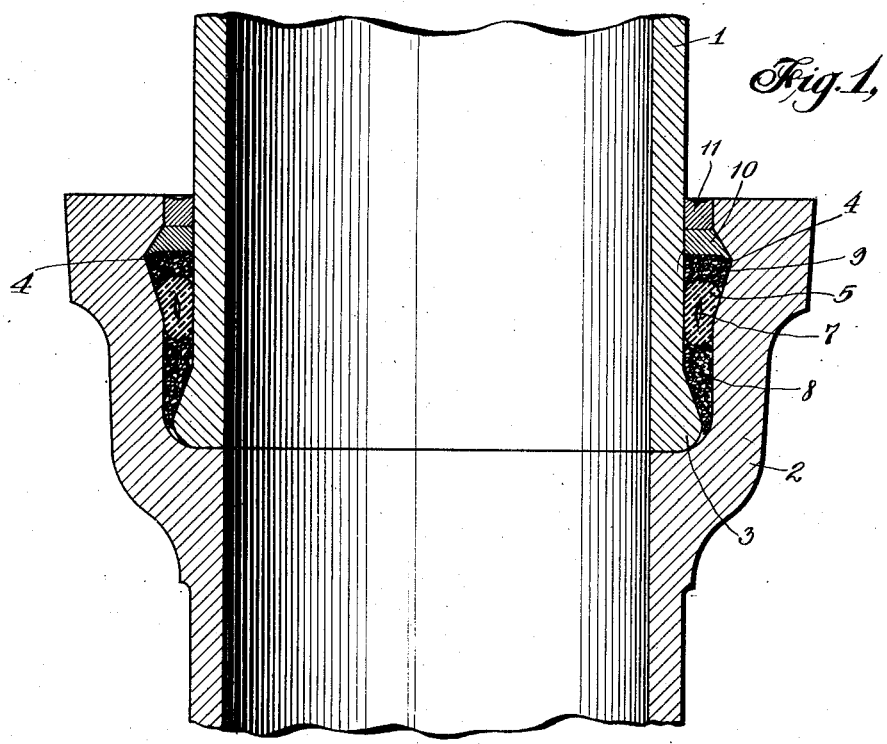
Fig.1,
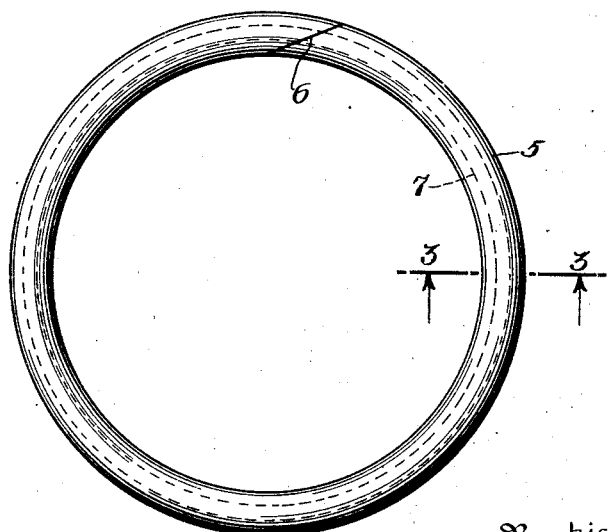
Fig.2,
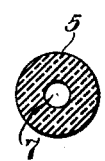
Fig.3,
Inventor
FRANK R. BIGLER
By his Attorney Patented July 20, 1926.

1,593,009

UNITED STATES PATENT OFFICE.

FRANK ROBINSON BIGLER, OF KANSAS CITY, MISSOURI.

PACKING.

Application filed December 19, 1924. Serial No. 756,901.

My invention is an improvement in packings, and more particularly in packings for use between the spigot and bell of contiguous pipe sections.

In the usual arrangement of packing of this character, when rings of resilient material as for instance rubber, are used, they are of solid construction, and of a cross sectional area to fit between the bell and spigot and are compressed between substantially rigid fillers on either side.

The ring in effect is held under compression in a chamber with rigid walls, and so used the ring is merely a layer of the packing, tightly compressed, and permanently distorted into a cross sectional shape corresponding to that of the annular chamber between the rigid walls of bell, spigot and filler. So held the ring cannot perform its intended function as a resilient element of the packing, conforming closely to changes in relative position between the bell and spigot, thereby to maintain a tight seal between the parts. Moreover when so treated they soon become brittle and no longer resilient.

An object of the present invention is to provide a ring so constructed that the natural resiliency thereof is utilized to the best advantage and impaired as little as possible by compression between rigid surfaces.

Another object is to provide a ring of such a nature and so constructed, that when it is compressed in one dimension between the rigid walls of bell and spigot, it may expand with comparative freedom in the other dimension.

To the accomplishment of the foregoing and such other objects as may hereinafter appear, my invention consists in the elements and their relation one to the other, as hereinafter defined in the appended claims, reference being had to the accompanying drawings forming a part thereof, which show a preferred embodiment of the invention, and in which:

Fig. 1 is a horizontal section through the bell and spigot of contiguous pipe sections.

Fig. 2 is a plan view of the resilient ring.

Fig. 3 is a section on the line 3—3 of Fig. 2.

In the present embodiment of the invention, the spigot and bell ends 1 and 2 respectively, of the contiguous pipe sections, which may be of any character and designed for any purpose, as for instance the transport of fluid, are interengaged in the usual manner, the spigot fitting into the bell. In the present instance but not necessarily the spigot has an external annular rib 3 at its inner end, while the bell has an internal annular groove at its outer end the rib and groove when they occur, serving as abutments for the packing.

The improved packing includes a ring 5 of a suitable resilient material, as for instance rubber, the ring being hollow, and preferably circular in cross-section. It may be a continuous integral structure, or it may be formed from a length of tubing of suitable size, the ends thereof being beveled and spliced as at 6 to form a ring. When the ring is from a length of tubing as above mentioned, the ends may be spliced, merely by connecting them with a metal tube, as for instance lead, engaging within the bore at the ends, or cement may be used if desired. Preferably the ring has an internal diameter approximately that of the external diameter of the spigot.

Any preferred character of filler may be used with the ring, and the order and arrangement of the ring and filler may be widely varied. As for instance a filler 8 of fibrous material, such as soap treated jute, known in the trade as Miller grip hemp, may be calked into the bell at the inner end of the spigot, and an outer filler 9 of like material, may be arranged at the outer side of the ring. During the insertion of the inner filler 8, the ring may be moved outwardly on the spigot, so that it will not interfere with the placing of the filler, being pushed into the bell after the filler 8 is placed.

The joint or packing may be completed by the tamping in of a cold lead follower. In the present instance the follower is formed by strips 10 and 11, and the strip 11 is just within the groove 4 of the bell so that it locks the packing firmly in place. Instead of lead strips, cast lead, lead wool or like material, or cement may be used.

With 6 in. pipe the parts of the packing when arranged as above specified should have approximately the following dimensions. The filler 8 a depth of 1 and ½ inch; the ring 5 a diameter of ⅝ of an inch, and a core diameter of 3/16 of an inch; the filler 9 a depth of ½ inch, and the strips 10 and 11 an aggregate depth of ⅞ of an inch. The dimensions however will vary in accordance with conditions.

With this arrangement, the ring 5 is so placed that it may conform itself to changes in relative position between spigot and bell, due to longitudinal movement from expansion and contraction or from lateral deflection, while maintaining the tight joint. The ring is well protected from the material traveling through the pipe, whether liquid or gaseous. A hollow or cored ring being more flexible and more easily conformable to changes in position is preferable, but in some circumstances a solid ring may be used.

While the ring 5 is shown with fibrous fillers on either side, it serves the purpose equally well when arranged close up within the joint, with the filler on the outer side. While the ring in the present instance is shown in connection with fillers of fibrous material, such as hemp it is obvious that it might be used with any character of filling, and even between rigid surfaces on all sides, since the chamber or core within the ring permits expansion of the material of the ring in one direction. Neither is it essential that the ring be circular in cross section. It may be oval, or even polygonal in cross section.

I claim:

1. In combination with pipe sections, each having at one end a bell to receive the opposite end of the other section, a packing comprising a hollow rubber ring under radial compression between the bell and spigot, and fillers of fibrous material on each side of the ring.

2. In combination with pipe sections, each having at one end a bell to receive the opposite end of the other section, a packing comprising a hollow rubber ring under radial compression between the bell and spigot, a filler of fibrous material on each side of the ring, and a metal follower to hold the parts in place.

3. In combination with pipe sections, each having at one end a bell to receive the opposite end of the other section, a packing comprising a resilient ring under radial compression between said bell and spigot, and fillers of fibrous material on each side of the ring.

4. In combination with pipe sections, each having at one end a bell to receive the opposite end of the other section, a packing comprising a resilient ring under radial compression between said bell and spigot, fillers of fibrous material on each side of the ring, and a follower or clamping ring to hold the parts in place.

5. In combination with pipe sections, each having at one end a bell to receive the opposite end of the other section, a packing comprising a resilient ring under radial compression between said bell and spigot, fillers of fibrous material on each side of the ring, and a follower or clamping member of malleable material for the fillers.

6. In combination with pipe sections, each having at one end a bell to receive the opposite end of the other section, a packing comprising a hollow ring of rubber under radial compression between the bell and spigot, and fillers of fibrous material on each side of the ring.

7. In combination with pipe sections, each having at one end a bell to receive the opposite end of the other section, a packing comprising a layer of rubber under radial compression between the bell and spigot, and fillers of fibrous material on each side of the rubber.

Signed at Kansas City, in the county of Jackson and State of Missouri, this 3rd day of Novbr. A. D. 1924.

FRANK ROBINSON BIGLER.